US011584392B2

United States Patent
Smith et al.

(10) Patent No.: US 11,584,392 B2
(45) Date of Patent: Feb. 21, 2023

(54) ROUTE OPTIMIZATION FOR AUTONOMOUS DRIVING SYSTEMS

(71) Applicant: Waymo LLC, Mountain View, CA (US)

(72) Inventors: David Smith, Mountain View, CA (US); Christopher Bowen, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 42 days.

(21) Appl. No.: 16/949,586

(22) Filed: Nov. 4, 2020

(65) Prior Publication Data

US 2022/0135071 A1     May 5, 2022

(51) Int. Cl.
| | |
|---|---|
| *B60W 60/00* | (2020.01) |
| *G01C 21/34* | (2006.01) |
| *B60W 10/10* | (2012.01) |
| *B60W 10/04* | (2006.01) |
| *G01C 21/36* | (2006.01) |

(52) U.S. Cl.
CPC ........ *B60W 60/0011* (2020.02); *B60W 10/04* (2013.01); *B60W 10/10* (2013.01); *G01C 21/3469* (2013.01); *G01C 21/3492* (2013.01); *G01C 21/3691* (2013.01); *B60W 2555/20* (2020.02); *B60W 2555/60* (2020.02); *B60W 2556/10* (2020.02)

(58) Field of Classification Search
None
See application file for complete search history.

(56) References Cited

U.S. PATENT DOCUMENTS

| | | | |
|---|---|---|---|
| 8,762,048 B2 * | 6/2014 | Kosseifi | G08G 1/096844 |
| | | | 701/410 |
| 9,157,756 B2 * | 10/2015 | Mason | G06Q 10/063112 |
| 10,118,639 B2 * | 11/2018 | Zhu | B62D 6/002 |
| 10,698,409 B1 * | 6/2020 | Siegel | G05D 1/0246 |
| 10,744,997 B2 | 8/2020 | Muhlfeld et al. | |
| 2016/0153796 A1 | 6/2016 | Stankoulov | |
| 2017/0350715 A1 | 12/2017 | Tanizaki et al. | |
| 2018/0080785 A1 * | 3/2018 | Han | G08G 1/0112 |
| 2018/0174451 A1 * | 6/2018 | Rao | G01C 21/3461 |
| 2020/0101974 A1 * | 4/2020 | Ha | G05D 1/0088 |

FOREIGN PATENT DOCUMENTS

| | | |
|---|---|---|
| JP | 2012220427 A | 11/2012 |
| KR | 20130034917 A | 4/2013 |

OTHER PUBLICATIONS

International Search Report and Written Opinion dated Feb. 25, 2022, on application No. PCT/US2021/057953, 10 pages.

\* cited by examiner

*Primary Examiner* — Abdhesh K Jha
(74) *Attorney, Agent, or Firm* — Lowenstein Sandler LLP

(57) ABSTRACT

Aspects and implementations of the present disclosure address shortcomings of the existing technology by enabling routing of an autonomous vehicles (AV) by identifying routes from a first location to a second location, identifying a target efficiency value of autonomous driving along a respective route, determining, in view of historical data for the respective route and using one or more randomized conditions, a confidence level associated with the target efficiency value, selecting, based on the target efficiency values and the associated confidence level, a preferred route, and causing the AV to select the first route for travel from the first location to the second location.

20 Claims, 7 Drawing Sheets

ROUTE OPTIMIZATION FOR AUTONOMOUS DRIVING SYSTEMS

TECHNICAL FIELD

The instant specification generally relates to autonomous vehicles. More specifically, the instant specification relates to route optimization for autonomous driving systems using simulations based on realistic conditions that autonomous vehicles are likely to encounter in the course of a driving mission.

BACKGROUND

An autonomous vehicle operates by sensing an outside environment with various sensors and charting a driving path through the environment based on the sensed data, Global Positioning System (GPS) data, and road map data. Among the autonomous vehicles are trucks used for long-distance load deliveries. Trucking industry is sensitive to various costs and, in particular, fuel costs. To improve fuel efficiency, human truck drivers use a variety of driving techniques, such as maintaining a constant speed whenever possible, accelerating through downhill sections of the road in order to acquire an additional momentum to carry the vehicle into subsequent uphill sections, and other techniques, which can be equally useful for autonomous vehicles. Successful implementation of such methods, however, can depend on the road conditions. Higher efficiency is usually achieved when traffic is light. Conversely, presence of a large number of other trucks, carrying different loads and moving with different speeds, as well as passenger cars, motorhomes, and other vehicles is often detrimental to driving performance. Challenging weather conditions can introduce further uncertainty and increase costs while negatively affecting expected delivery times.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
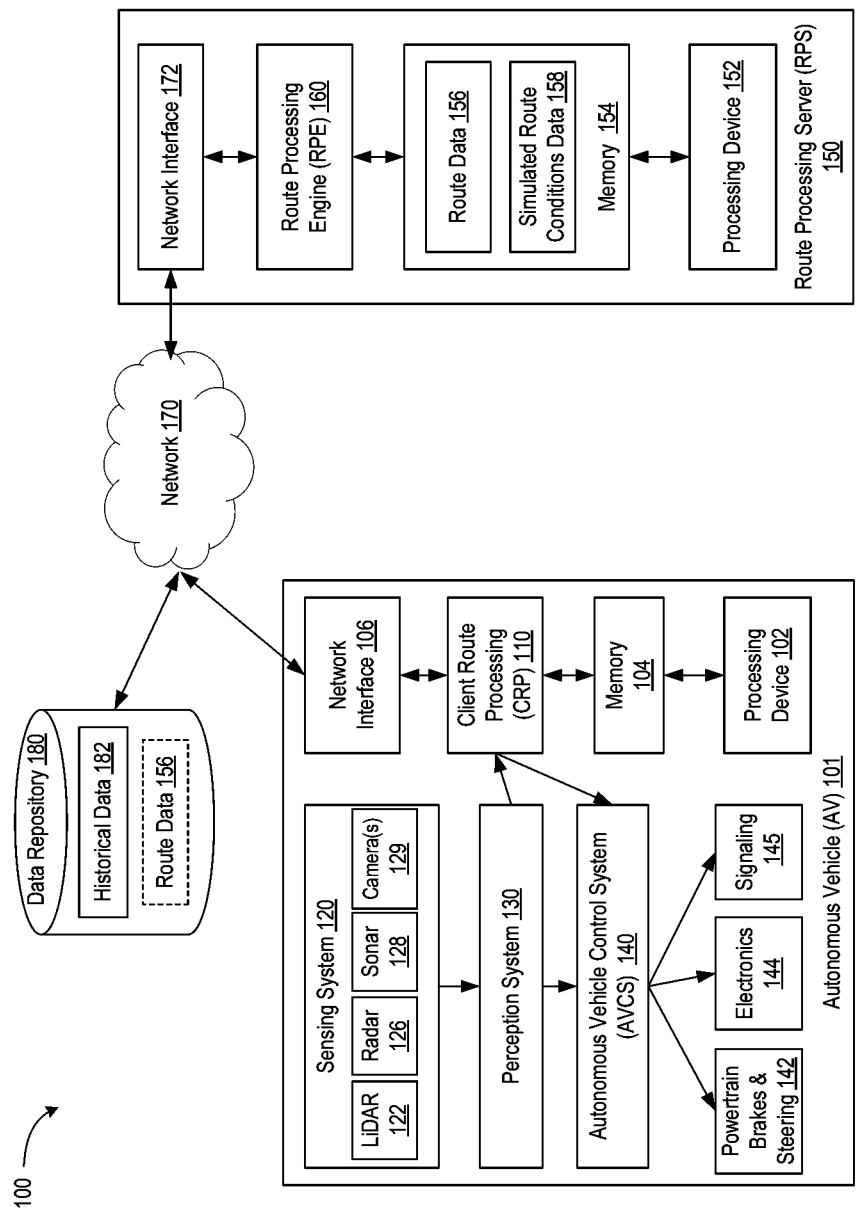
FIG. 1 is a diagram illustrating components of an example architecture of a system that provides a route optimization for an autonomous vehicle, in accordance with some implementations of the present disclosure.

In one implementation, disclosed is a method for routing an autonomous vehicle (AV), including identifying a plurality of routes from a first location to a second location, identifying, for each of the plurality of routes, a target efficiency value of autonomous driving along a respective route, wherein the target efficiency value is based, at least in part, on characteristics of the respective route, determining, in view of historical data for the respective route, a confidence level associated with the target efficiency value, wherein determining the confidence level comprises using one or more randomized conditions for the respective route, selecting, based on the target efficiency value and the associated confidence level for each of the plurality of routes, a first route of the plurality of routes, and causing the AV to select the first route for travel from the first location to the second location.

In another implementation, disclosed is a system for routing an autonomous vehicle (AV) that includes a memory device and a processing device, communicatively coupled to the memory device, wherein the processing device is to identify a plurality of routes from a first location to a second location, identify, for each of the plurality of routes, a target efficiency value of autonomous driving along a respective route, wherein the target efficiency value is based, at least in part, on characteristics of the respective route, determine, in view of historical data for the respective route, a confidence level associated with the target efficiency value, wherein determining the confidence level comprises using one or more randomized conditions for the respective route, select, based on the target efficiency value and the associated confidence level for each of the plurality of routes, a first route of the plurality of routes, and cause the AV to select the first route for travel from the first location to the second location.

In another implementation, disclosed is a non-transitory computer-readable medium having instructions stored thereon that, when executed by a computing device, cause the computing device to identify a plurality of routes for an autonomous vehicle (AV) from a first location to a second location, identify, for each of the plurality of routes, a target efficiency value of autonomous driving along a respective route, wherein the target efficiency value is based, at least in part, on characteristics of the respective route, determine, in view of historical data for the respective route, a confidence level associated with the target efficiency value, wherein determining the confidence level comprises using one or more randomized conditions for the respective route, select, based on the target efficiency value and the associated confidence level for each of the plurality of routes, a first route of the plurality of routes, and cause the AV to select the first route for travel from the first location to the second location.

DETAILED DESCRIPTION

A vehicle (e.g., a truck) traveling over a long-distance route, incurs significant costs in fuel, vehicle depreciation, driver salary (if the vehicle is driver-operated) and/or technological support (if the vehicle is self-driving), wearable components (e.g., tires, oil), and so on. The costs of operating the vehicle depend on a route taken and a respective route topography. For example, a vehicle traveling from Chicago to Los-Angeles needs to cross the Rocky Mountains along one of possible roads, e.g., through Wyoming, Colorado, or New Mexico. Fuel efficiency of big trucks can be as low as 3 mpg when moving uphill, and a choice of a route can significantly affect the total cost of travel and load delivery. Various routes differ by the total length of travel, maximum allowed driving speeds, curvature of the road, number of lanes, the amount of grades that the vehicles have to negotiate, maximum elevation gain/loss, and so on. For example, one route can have a steady uphill grade whereas another route can include a sequence of steeper uphill grades interspersed with downhill sections, one route can avoid higher elevations but at a cost of having a longer distance to cover. Some routes can have topography (e.g., elevation, road curvature) and other physical characteristics (e.g., road surface quality, number of lanes) that are favorable, but can be heavily trafficked at certain times of day, which can significantly reduce or completely negate the advantages. Random road closures, traffic accidents, and inclement weather changes can affect various routes and change the balance of advantages and disadvantages. For example, a fast route that has a high peak traffic can be prone to accidents, which can cause long delays and slowdowns that a vehicle taking a sub-optimal route is less likely to experience. Predicting the likelihood of efficiently completing a trucking mission can, therefore, be difficult or nearly impossible with currently available methods, such as using weather forecasts, data about average traffic flow, average speed of travel, and so on.

Aspects and implementations of the present disclosure address these and other shortcomings of the existing technologies by enabling methods of identifying and quantitatively assessing most efficient routes and trajectories for a given driving mission (e.g., travelling from a first location A to a second location B), and pre-estimating the likelihood of following the identified trajectories, for ultimate selection of routes that are most likely to provide superior driving performance. The computations and simulations disclosed herein can be performed prior to starting a driving mission and can improve the autonomous vehicle performance by having multiple driving options readily available and properly evaluated. More specifically, some implementations disclosed herein include identifying multiple available routes and assessing optimal (or target) trajectory for each route. Herein "route" shall refer to a sequence of physical locations (e.g., geographic markers) that can be traveled by a target vehicle between a starting point ("start") and a destination point ("destination"). The start and/or the destination need not be the initial and final locations of the vehicle in the driving mission, but can be any two points (e.g., A and B) along such a mission. Accordingly, "mission" herein shall refer to any portion of the overall driving task. "Trajectory" shall refer to driving settings, specified for various locations along the route, and shall include speed/throttle/brake/etc. control that determine progression of the vehicle along the route. For example, a trajectory can include throttle settings, T(L) as a function of the location L along the route, target speed of the vehicle S(L), gear selection sequences, and so on. The location L can be identified by the distance travelled, GPS coordinates, road markers (e.g., mileposts), or a combination thereof, or in any other way. "Ideal" trajectory shall refer to a trajectory that can be used by the target vehicle under a (hypothetical) absence of other cars and favorable weather conditions, given the observance of legal constraints (e.g., maximum speed allowed, regulatory time delays related to inspections, weighing, and so on) and physical constraints (e.g., a specific type of the vehicle, a load weight and type, and so on). The optimal trajectory can be a trajectory that maximizes efficiency of the driving mission. "Efficiency" shall refer to a measure of the trajectory's performance in relation to a set of predetermined criteria, such as a total fuel consumption and/or cost of the mission, total time of travel, total distance travelled, and so on, or any combination thereof.

Using the computed optimal trajectory, some implementations disclosed herein include performing simulations to identify a set (ensemble) of realistic trajectories, which can be based on the optimal trajectory while considering the likely weather, traffic, road closures, and other obstacles. The simulations can be probabilistic in nature and can be based on historical data collected for the same route (or similar routes in the same geographic area). Based on the realistic trajectories computed for various routes, some implementations disclosed herein can identify a target efficiency value of each possible route, select a preferred route, and set up the vehicle's mission according to the identified preferred route. In some instances, where the selected route is temporarily disturbed (e.g., by unfavorable weather or traffic conditions), some implementations disclosed herein can enable the vehicle to return to the optimal trajectory. In some instances, where the disturbance is more significant and/or extended in time, some implementations disclosed herein enable switching to a different route that can be more efficient given the current conditions. In some instances, where the disturbance is so severe that the precomputed routes and optimal/realistic trajectories are not capable of optimizing further progression to the destination, some implementations disclosed herein enable repeating the computations using the current location of the vehicle as the new starting point to identify the best possible route/trajectory under the existing conditions while also taking into account possible future uncertainties.

Aspects and implementations disclosed herein provide numerous advantages over existing technologies, including but not limited to enabling efficient realistic pre-planning of driving missions and selection of routes that are most likely to provide superior driving performance, minimize costs, and ensure timely accomplishment of driving missions, using realistic simulations based on historical data. Furthermore, disclosed implementations enable determination of driving settings for maximizing driving performance along the selected routes as well as recovery from delays caused by unfavorable route conditions. Additionally, in cases of significant delays during actual driving missions, disclosed implementations enable quick on-the-fly re-routing of autonomous vehicles to more efficient routes.

FIG. 1 is a diagram illustrating components of an example architecture 100 of a system that provides a route optimization for an autonomous vehicle (AV) 101, in accordance with some implementations of the present disclosure. Although alternatively referred to as "trucks," autonomous vehicles can include any motor vehicles, such as cars, tractors (with or without trailers), buses, motorcycles, all-terrain vehicles, recreational vehicles, any specialized farming or construction vehicles, and the like), or any other self-propelled vehicles capable of being operated in a self-driving mode (without a human input or with a reduced human input). AV 101 can be capable of traveling on paved and/or unpaved roadways, off-road, on various surfaces encountered on farming (or other agricultural) land, within a driving environment (including indoor environment) of an industrial plant, and so on. Example architecture 100 can include a route processing server (RPS) 150 which can provide route processing assistance to AV 101, as well as to other vehicles (not shown), as described in more detail below.

AV 101 can include a sensing system 120. The sensing system 120 can include various electromagnetic (e.g., optical) and non-electromagnetic (e.g., acoustic) sensing subsystems and/or devices that can be used in object sensing to facilitate autonomous driving, e.g., distance sensing, velocity sensing, acceleration sensing, rotational motion sensing, and so on. For example, optical sensing can utilize a range of light visible to a human eye (e.g., the 380 to 400 nm wavelength range), the UV range (below 380 nm), the infrared range (above 400 nm), the radio frequency range (above 1 m), etc. In implementations, "optical" can include any other suitable range of the electromagnetic spectrum.

The sensing system 120 can include one or more radar units 126, which can be any system that utilizes radio or microwave frequency signals to sense objects within the driving environment of the AV 101. The radar unit(s) can be configured to sense both the spatial locations of the objects (including their spatial dimensions) and their velocities (e.g., using the Doppler shift technology), such as translational velocities and angular (rotational) velocities. The sensing system 120 can include one or more LiDAR sensors 122 (e.g., a LiDAR rangefinders), which can be laser-based units capable of determining distances (e.g., using ToF technology) to the objects in the environment around AV 101. For example, LiDAR(s) 122 can emit one or more laser signals (pulses) that travel to an object and then detect arrived signals reflected from the object. By determining a time delay between the signal emission and the arrival of the retro-reflected waves, a ToF LiDAR can determine the distance to the object. LiDAR(s) 122 can emit signals in various directions to obtain a wide view of the outside environment. LiDAR(s) 122 can utilize wavelengths of electromagnetic waves that are shorter than the wavelength of the radio waves and can, therefore, provide a higher spatial resolution and sensitivity compared with the radar unit 126. In some implementations, LiDAR(s) 122 can be (or include) coherent LiDAR(s), such as a frequency-modulated continuous-wave (FMCW) LiDAR(s). FMCW LiDAR(s) (or some other coherent LiDAR sensors) can use optical heterodyne detection for instant velocity determination. LiDAR(s) 122 can include one or more laser sources producing and emitting signals and one or more detectors of the signals reflected back from the objects, one or more spectral filters to filter out spurious electromagnetic waves having wavelengths (frequencies) that are different from the wavelengths (frequencies) of the emitted signals, one or more directional filters (e.g., apertures, diffraction gratings, and so on) to filter out electromagnetic waves that arrive at the detectors along directions different from the directions of the emitted signals, and other components that can enhance sensing capabilities of the LiDAR(s) 122. In some implementations, LiDAR(s) 122 can ensure a 360-degree view in a horizontal direction and up to 90 degrees in the vertical direction.

Sensing system 120 can further include one or more cameras 129 to capture images of the driving environment. The images can be two-dimensional projections of the driving environment (or parts of the driving environment) onto a projecting plane (flat or non-flat, e.g. fisheye) of the cameras. Some of cameras 129 of sensing system 120 can be video cameras configured to capture a continuous (or quasi-continuous) stream of images of the driving environment. Sensing system 120 can also include one or more sonars 128, which can be ultrasonic sonars, in some implementations.

The sensing data obtained by sensing system 120 can be processed by a perception system 130 that can be configured to detect and track objects in the driving environment and to identify the detected objects. For example, perception system 130 can analyze images captured by cameras 129 and can be capable of detecting traffic light signals, road signs, roadway layouts (e.g., boundaries of traffic lanes, topologies of intersections, designations of parking places, and so on), presence of obstacles, and the like. Perception system 130 can further receive the LiDAR sensing data (coherent Doppler data and incoherent ToF data) to determine distances to various objects in the environment and velocities of such objects. In some implementations, perception system 130 can use the LiDAR data in combination with the data captured by the camera(s) 129. In one example, the camera(s) 129 can detect an image of a rock partially obstructing a traffic lane. Using the data from the camera(s) 129, the perception system 130 can be capable of determining the angular size of the rock, but not the linear size of the rock. Using the LiDAR data, perception system 130 can determine the distance from the rock to the AV and, therefore, by combining the distance information with the angular size of the rock, perception system 130 can determine the linear dimensions of the rock as well.

In another implementation, using the LiDAR data, perception system 130 can determine how far a detected object is from the AV and can further determine the component of the object's velocity along the direction of the AV's motion. Furthermore, using a series of quick images obtained by the camera, perception system 130 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction.

Perception system 130 can further receive information from a GPS transceiver (not shown) configured to obtain information about the position of the AV relative to Earth and use the GPS data in conjunction with the sensing data to help accurately determine location of the AV with respect to fixed objects of the driving environment, such as roadways, lane boundaries, intersections, sidewalks, crosswalks, road signs, surrounding buildings, and so on, locations of which can be provided by map information accessible by perception system 130. In some implementations, perception system 130 can receive non-electromagnetic data, such as sonar data (e.g., ultrasonic sensor data), temperature sensor data, pressure sensor data, meteorological data (e.g., wind speed and direction, precipitation data), or other environmental monitoring data.

The data generated by perception system 130 as well as various additional data (e.g., GPS data processing module, environmental monitoring data, and the like) can be used by an autonomous driving system, such as AV 101 control system (AVCS) 140. The AVCS 140 can include one or more algorithms that control how AV 101 is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 142, vehicle electronics 144, signaling 145, and other systems and components not explicitly shown in FIG. 1. The powertrain, brakes, and steering 142 can include an engine (internal combustion engine, electric engine, and so on), transmission, differentials, axles, wheels, steering mechanism, and other systems. The vehicle electronics 144 can include an on-board computer, engine management, ignition, communication systems, carputers, telematics, in-car entertainment systems, and other systems and components. The signaling 146 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 142 (or signaling 146) whereas other instructions output by the AVCS 140 are first delivered to the vehicle electronics 144, which generate commands to the powertrain, brakes, and steering 142 and/or signaling 145.

In one example, the AVCS 140 can determine that an obstacle identified by perception system 130 is to be avoided by decelerating the vehicle until a safe speed is reached, followed by steering the vehicle around the obstacle. The AVCS 140 can output instructions to the powertrain, brakes, and steering 142 (directly or via the vehicle electronics 144) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, brakes, and steering 142 to resume the previous speed settings of the vehicle.

Example architecture 100 can include a route processing server (RPS) 150 to enable route processing and trajectory selection. RPS 150 can be, at least at times, communicating with AV 101 via network 170. In some implementations, AV 101 can be connected to network 170 at most or all times. In some implementations, AV 101 can establish connections to network 170 intermittently, when an appropriate network signal is available. In some implementations, AV 101 can be connected to network 170 prior to stating the driving mission. Network 170 can be a wireless connection, such as a broadband cellular connection (e.g., 3G, 4G, 4G LTE, 5G, connection(s), and so on), a wireless local area network (WLAN), a wireless wide area network (WWAN), a wired connection, a satellite connection, or the like. Connection to network 170 can be facilitated via a network interface 106 (on the side of AV 101) and a network interface 172 (on the side of RPS 150). Network interfaces 106 and 172 can include antennas, network controllers, radio circuits, amplifiers, analog-to-digital and digital-to-analog converters, physical layers (PHY), media access control layers (MAC), and the like.

RPS 150 can include route processing engine (RPE) 160. RPE 160 can be executed by one or more processing devices 152, in communication with memory 154, which may be volatile or non-volatile memory, such as random-access memory (RAM), read-only memory (ROM), electrically erasable programmable read-only memory (EEPROM), or any other device capable of storing data. RPE 160 can be a collection of codes, libraries, frameworks, application programming interfaces (APIs,) and other digital resources configured to perform various tasks related to route selection. Such tasks can include receiving a start and a destination for a driving mission, obtaining technical characteristics of a vehicle to be used and a load to be carried, identifying multiple routes connecting the start and the destination, determining an optimal trajectory, performing simulations to identify, e.g., for each route, a set of realistic trajectories based on the respective optimal trajectory and a multitude of simulated route conditions (e.g., weather, road surface conditions, traffic, etc.), determining a likelihood that the realistic trajectory will be realized during the actual driving mission, comparing various identified routes/realistic trajectories, and selecting primary and secondary (back-up) routes/trajectories for AV 101. RPE 160 can operate in conjunction with a client route processing (CRP) 110, which can be a local component of the route processing application installed on AV 101 ("client"). In some implementations, CRP 110 can be capable of collecting information about the upcoming driving mission and technical characteristics of the AV 101, such as a type and model of the vehicle, an empty weight of the vehicle, a size and weight of the load, a technical state of the vehicle (e.g., of the vehicle's engine, drivetrain, tires, braking system, etc.), and/or any other vehicle-specific information (e.g., the maintenance/service data). CRP 110 can communicate the collected information to RPE 160 via network 170 and receive from RPE 160 information about optimal routes, target trajectories, driving settings (speed regime, throttle/brake/gear settings) for various portions of the routes, and the like. In some implementations, CRP 110 can perform at least some of the functions and computations of RPE 160. For example, CRP 110 can perform some computations that require moderate resources (e.g., identifications of possible routes) whereas heavy computational tasks (e.g., randomized simulations) can be performed by RPE 160. Operations of CRP 110 can be executed by one or more processing devices 102 in communication with memory 104, which may be a volatile and/or non-volatile memory device capable of storing data.

In some implementations, CRP 110 can implement one of the identified routes using one of the optimal trajectories computed by RPE 160 (and/or CRP 110). Specifically, based on the obtained optimal trajectory, CRP 110 can identify, for each or some of the portions of the route, driving settings, such as target speed of AV 101, throttle settings, target lane, and the like. CRP 110 can provide the identified settings to the AVCS 140, and the AVCS 140 can communicate the provided driving settings to powertrain, brakes, and steering 142, electronics 144, signaling 145, as well as other systems and components of AV 101.

CRP 110 can synchronize the driving settings with the vehicle location data obtained from the vehicle's GPS system. For example, the GPS system can indicate to CRP 110 that AV 101 is approaching a 2-mile downhill portion of the route with a 10-degree grade followed by a long uphill 5-degree section. CRP 110 can access the optimal trajectory data and obtain target throttle settings (which can be stored in memory 104) for the downhill portion. CRP 110 can communicate the obtained settings to the AVCS 140 which can cause AV 101 to accelerate (e.g., by using gravity and/or opening throttle) to achieve a recommended velocity at the lowest point before starting the uphill climb. Similarly, CRP 110 can identify the lowest point using GPS and/or map data and output new (uphill) throttle settings to AVCS 140 prior to the start of the uphill portion.

In some implementations, CRP 110 can obtain additional data from perception system 130 and can adjust the output (provided to AVCS 140) from the optimal driving settings, based on the current traffic conditions, which can include presence of other vehicles on or near the roadway. For example, if the distance to a vehicle traveling within the same lane is less than a threshold distance, CRP 110 can forfeit acceleration on the downhill slope or perform it to a reduced degree. In some implementations, CRP 110 can be agnostic about the outside environment and output target data in all instances. In such implementations, AVCS 140 can be an ultimate decision-maker, identifying current driving settings based on optimal driving settings obtained from CRP 110 and information about the driving environment obtained from perception system 130, overriding the optimal driving settings when the environment data from perception system 130 indicates that execution of the optimal trajectory is impossible or unsafe. Once the traffic conditions change to more favorable, CRP 110 can reassess the current location, speed, lane position, etc. of AV 101, compute an optimal way to return to the optimal trajectory, and provide the AVCS 140 with respective instructions.

Realistic trajectories can be simulated by RPE 160 (and/or CRP 110) using historical data 182, which can be stored in data repository 180 accessible to RPS 150 and AV 101 over network 170. Historical data 182 can include data collected during prior driving missions and structured using various data categories, for convenience of use. For example, historical data 182 can include traffic data, road closures data, information about speed of the autonomous vehicles at various points along the routes, timeline of the prior missions, fuel efficiency data, and so on. Historical data 182 can also include weather data for the prior missions such as ambient temperature, wind speed and direction, precipitation data, and so on. Historical data 182 can also include road surface conditions, such as the road surface temperature, wetness of the road surface (dry, moist, wet, slushy, snowy, deep snow, ice, etc.). In some implementations, historical data 182 can be stored on data storages in processed form, e.g., using various statistical representations. For example, some of the historical data categories can be represented in the form of statistical parameters. As a way of example, speed of traffic V at a specific portion of the road can be characterized by a distribution $D(V)$, indicating that the probability of the speed of traffic is within the interval $[V, V+\Delta V]$ is $D(V)\Delta V$. Alternatively, the speed of traffic can be characterized by the expectation value $E[V]$ (first moment), variance $Var[V]$ (second moment), as well as higher order moments (skewness, kurtosis, etc.) or cumulants of the distribution $D(V)$.

Based on historical data 182, RPE 160 (and/or CRP 110) can produce simulated route conditions data 158. Simulated route conditions data 158 can be based on route data 156 and on historical data 182. Route data 156 can include information about physical characteristics of various routes, such as quality of road surfaces, topography of the roads (e.g., grade and radius of curvature), number of lanes, speed limits, type and number of exit ramps, availability of gas stations, and so on. Route data 156 can also (or alternatively) be stored in data repository 180. Route data 156 can be used to determine optimal/realistic trajectories for each of the routes identified as viable options for the driving mission. Simulated route conditions data 158 can include multiple simulated instances of weather/traffic/road closures, to simulate realistic driving conditions along each route, as described in more detail below.

Figure 2:
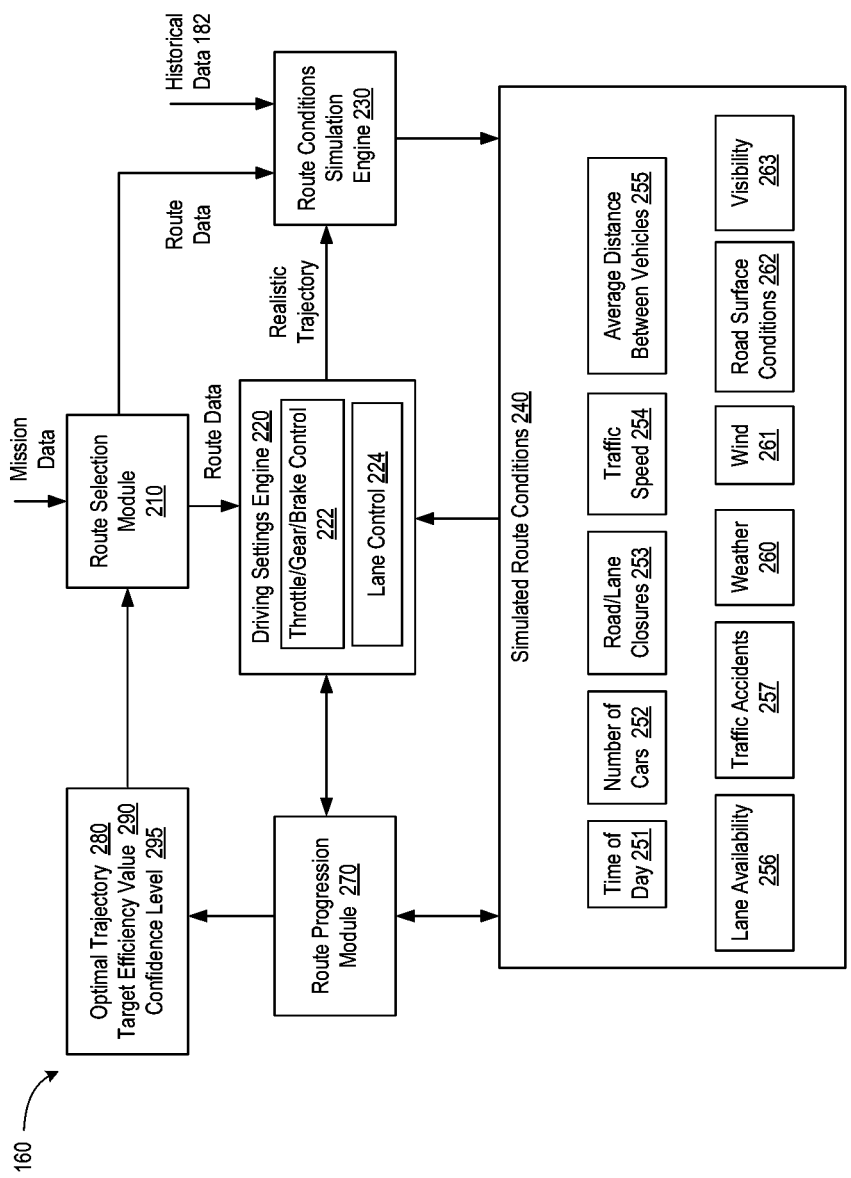
FIG. 2 is a diagram illustrating example operations and data flows during route optimization for an autonomous vehicle, in accordance with some implementations of the present disclosure.

FIG. 2 is a diagram illustrating example operations and data flows during route optimization for an autonomous vehicle, in accordance with some implementations of the present disclosure. In some implementations, all operations depicted in FIG. 2 are performed by RPE 160. In some implementations, some (or all operations) are performed by CRP 110 whereas remaining operations are performed by RPE 160. In some implementations, operations depicted in FIG. 2 can be performed prior to the start of a driving mission, whereas in some instances (e.g., to enable re-routing) some of the operations can be performed while the driving mission is under way. In some implementations, various modules and/or engines depicted in FIG. 2 can be parts of RPE 160 (and/or CRP 110) whereas in other implementations, some of the modules and/or engines can be implemented by other components of RPS 150 or AV 101, or other devices and servers not shown in FIG. 1.

A route selection module 210 can receive input data with details of the driving mission, such as a start A and a destination B, expected date/time of day of departure, type and technical characteristics of the vehicle, type and weight of the load, and so on. The input data can be provided by a human dispatch operator, from an automated dispatch system, from a shipping company, and the like. Route selection module 210 can identify various possible routes for the driving mission. For example, route selection module 210 can have access to map data with various roads classified by the types of vehicles/loads that can be used on respective roads. Some roads can be classified as "acceptable" for light trucks/loads but "not acceptable" for heavy trucks, trucks with trailers, gas/oil tankers, and so on. In view of the vehicle/load for the driving mission, route selection module 210 can select acceptable roads, and select all viable routes for the mission. In some implementations, all acceptable roads can be represented by a graph, and various possible paths from A to B identified on the graph. Paths that have a length that exceeds the minimum length path by a certain predetermined amount, e.g., 10%, 20%, 25%, or any other amount can be discarded. Likewise, all self-intersecting paths can be discarded. In some implementations, each road can have an average speed associated with the road. Using such data, some paths can be discarded if the total travel time, computed using the respective average speeds, exceeds the minimum travel time by a predetermined amount (e.g., by 30%). In some implementations, routes that correspond to the same graph (e.g., follow the same set of roads) but have different departure times can be processed as separate routes because such routes can have different traffic pattern (or different weather pattern, in case some weather conditions, e.g., rain or wind, correlate with the time of day).

After a set of viable routes (e.g., remaining paths in the graph and departure time) is identified, a driving settings engine 220 can determine an optimal trajectory for each route. The optimal trajectory can be a set of driving settings (block 222), such as throttle setting Throttle(l), as a function of the location l along the trajectory, brake (including Jake or engine brake) setting Brake(l), gear setting Gear(l), and so on. In some implementations, the set of driving settings can specify positive or negative changes (from the preceding settings), e.g., ΔThrottle(l), ΔGear(l) that are to be implemented at location l along the trajectory. For example, an eastbound route through Kansas and Colorado can have fixed (or occasionally changing) target throttle settings for hundreds of miles until the route begins a climb up the Rocky Mountains, where throttle settings can be modified much more frequently. In some implementations, the optimal trajectory can sometimes include (block 224) lane settings Lane(l), e.g., near road junctions, in mountainous regions, in cities, and so on.

The driving settings can be determined using various local-level formulas, tables, routines, and the like. For example, a part of the route with no grade or a grade that is constant over a relatively large distance can be characterized with optimal driving settings that are known functions of the road parameters (such as grade and radius of curvature of the road) and vehicle parameters: Throttle=$f$(grade, radius, vehicle type, weight), in one example. The function $f( )$ can be known from vehicle specification data, or determined previously by empirical testing. Sometimes the road can have a more complicated topography, such as a grade that is changing with location/distance, grade(l), on a shorter scale (e.g., hundreds or thousands of meters). "Grade" can be defined as a tangent of the angle that the road surface makes with a horizontal surface, or as any other function of the angle. In such instances, driving settings engine 220 can determine, by accessing previously obtained simulations, empirical data, technical specifications, or any combinations thereof to identify optimal settings, e.g., Throttle(l), Gear(l), over the short-scale horizon of variation of grade(l). For example, to negotiate an ascent after a descent, the optimal settings can include opening throttle and shifting to a higher gear on the descending portion, accelerating to achieve a target speed, and then downshifting before (or at the beginning of) the ascending portion while the vehicle still maintains a sufficient momentum. Required sequences of throttle, gear, brake, etc., control can be pre-computed and made available to the driving settings engine 220 in the form of libraries, subroutines, formulas, tables, or any other computer-accessible resources. An input into one or more such libraries can be a local topography of the road grade(l), radius(l), a speed limit within a particular section of the road, a number of lanes, and so on, and the output can be optimal driving settings for the section portion. Similar processes can be repeated for all sections of the route and the determined driving settings can constitute the optimal trajectory for the route. Various sections of the path can be processed sequentially, in the order in which the vehicle is to drive the mission. In some implementations, various sections can be processed in parallel. An optimal trajectory, which includes optimal settings for some, most, or all sections of the route can be determined for each identified route.

"Optimal settings" can be understood as referring to driving settings that optimize (e.g., maximize) certain predetermined performance metrics—herein referred to as "efficiency value"—that are used to evaluate fitness of various routes for a given driving mission. In some implementations, "optimal" relates to driving settings that maximize fuel efficiency (minimize fuel consumption). In other implementations, "optimal" relates to settings that minimize total driving time (maximize average speed). Accordingly, optimal trajectory can be a trajectory that maximizes the total efficiency value by providing driving settings that maximize individual efficiency values of various local sections of the route. In some implementations, optimal trajectory can be determined under favorable conditions, such as absence of traffic or road/lane closures, favorable weather conditions (dry road surface, absence of wind, good visibility, etc.), and so on. Optimal trajectories (optimal driving settings) shall not be understood to mean the trajectories (settings) that realize the most efficient driving. Optimal trajectories can still be subject to restrictions imposed by traffic laws, such as speed limits for various roads, the need to comply with regulations, such as to stop for inspections at weigh stations, state entry points, agricultural inspection points, and so on. Furthermore, under certain conditions, actual driving mission can occur with an efficiency value that exceeds the efficiency value of the optimal trajectory. For example, the optimal trajectory can be determined under no wind condition whereas in an actual driving mission a consistent tailwind can result in an even lower fuel consumption.

Various identified routes and optimal trajectories for the identified routes can be used to simulate realistic trajectories for each of the identified routes. A "realistic" trajectory is a trajectory that can be based on the optimal trajectory for the respective route but can be modified by taking into account various delays and obstacles that are likely to occur during the actual driving mission. Realistic route conditions can be generated by a route conditions simulation engine 230 based on the optimal trajectory for a respective route, mission data, and historical data 182 for the route. Route conditions simulation engine 230 can generate various simulated route conditions 240. Specifically, based on the mission data that can specify the day (e.g., weekday, weekend, holiday, etc.) and the time of day the mission is to commence, simulated route conditions engine 230 can determine (e.g., based on the optimal trajectory) at what time of day 251 the vehicle is likely to be at various locations along the route. Based on historical data 182, the route conditions simulation engine 230 can estimate a number of cars 252 passing per unit of time at various locations along the route (at correct times), a likelihood of road/lane closures 253 or traffic accidents 257, etc. Based on such data, the route conditions simulation engine 230 can further identify a likely traffic speed 254, average distance between vehicles 255 and lane availability 256 (e.g., how many lanes can be available at various locations). In some implementations, simulated route conditions 240 can depend on the departure time for the mission, as the route conditions simulations engine 230 can use historical data 182 that is specific for a particular time of day. For example, a route that starts from a metropolitan area during peak hours can have a different traffic pattern than the same route that commences during off-peak hours or during nighttime.

Based on historical data 182, the route conditions simulation engine 230 can also simulate possible weather conditions 260 that can occur at various locations along the route, including ambient temperature, road surface temperature, amount of precipitation, and so on. Among other things, the route conditions simulation engine 230 can simulate strength (e.g., in mph) and direction of wind 261, e.g., headwind, tai-wind, or crosswind. Based on weather data, the route conditions simulation engine 230 can also simulate road surface conditions 262, which can include dry surface, wet surface, light snow, slush, heavy snow, ice, black ice, and the like. Similarly, visibility 263 can also be determined based on weather conditions 260 and time of day 251.

The simulated route conditions 240 can be provided to the driving settings engine 220 for determination of realistic settings for various sections of the route in a similar fashion as described above in relation to determination of the optimal trajectory under favorable conditions. This time, however, various unfavorable simulated conditions 251-263 can cause the driving settings engine 220 to modify driving settings from the optimal values. For example, the average distance between vehicles 255 can impose limitations on the amount of acceleration that the vehicle can be capable of achieving prior to starting an uphill section and modify throttle/gear settings accordingly. Likewise, driving settings can be affected by the number of cars 252, lane availability 256, traffic speed 254, etc. Simulated wind conditions 261 together with actual route data (provided by the route selection module 210), e.g., grade and radius of curvature data, can determine how much the vehicle would have to slow down to safely navigate typical crosswinds encountered at specific locations along the route.

To identify a realistic trajectory for each instance of simulated realistic conditions, the driving settings engine 220 can use the same (or additional) libraries, routines, simulations as are used to identify the optimal trajectory. For example, various local driving settings, e.g., Throttle=f( ), Gear=g( ) can depend on additional route conditions such as wind, road surface conditions, average distance between cars, or other conditions 251-263. If it is determined that a particular driving maneuver (e.g., acceleration before an ascent) is statistically likely to be prevented by the simulated traffic conditions (e.g., insufficient average distance between vehicles), the driving settings engine 220 can assume that a different maneuver—characterized by a lower efficiency value—is to be implemented instead.

In some implementations, the driving settings engine 220 can perform multiple randomized simulations to obtain statistical data regarding route conditions that can occur at various locations along the route. For example, historical data 182 can be available in the form that enables identifying probabilities of occurrence of various route conditions, based on one or more statistical parameters. For example, the traffic speed V (or any other condition of the simulated route conditions 240), can be characterized by the expectation value of the respective distribution $E[V]$, variance $Var[V]$, skewness $Skew[V]$, kurtosis $Kur[V]$, all or some of which can be used to identify probabilities of occurrence of various values of V. Historical data 182 can be further characterized by covariances $Cov[C_j, C_k]$, between different route conditions $C_j, C_k$. A covariance $Cov[C_1, C_2]$ can indicate how likely a particular deviation of condition $C_1$ from its expectation value is accompanied by a related deviation of condition $C_2$, with a positive/negative covariance indicating that the two conditions are likely to move in the same/opposite direction(s) (from their respective expectation values). For example, traffic speed 254 can be positively correlated with lane availability (positive covariance) and negatively correlated with the average distance between the vehicles 255 (negative covariance).

A route progression module 270 can simulate progression of the vehicle along the route and keep track of the speed of the vehicle and its location (coordinates). The route progression module 270 can identify when traffic and weather conditions are likely to change (e.g., when the vehicle is entering or leaving a new climate region, such as plains, mountains, deserts, coastal areas, etc.). In cooperation with the route conditions simulation engine 230, the route progression module 270 can then generate new simulated route conditions 240 to be provided to the driving settings engine 220 to simulate optimal driving settings under a new set of non-ideal conditions for the next portion of the route. The route progression module 270 can evaluate the realistic driving settings obtained by the driving settings engine 220 and keep track of the total time of travel, fuel usage, average speed of the vehicle, and so on.

In some implementations, the driving settings engine 220 can use Monte Carlo simulations. More specifically, the driving settings engine 220 can select a particular section of the route, whose length can be chosen in view of how likely route conditions are to vary within this section. For example, in rural flat area, a section can be a hundred miles (or more) long whereas in an area that is close to a major city (where traffic patterns can change within each mile) or located in a mountainous region (where wind and/or precipitation patterns can depend significantly on the location), a section can be only a mile (or less) long. For the selected section of the route, the driving settings engine 220 can generate an ensemble of different route conditions, e.g., by randomly generating instances of various sets of one or more conditions $\{C_j\}$ of the route conditions 240 (and/or other conditions not explicitly listed in FIG. 2). For each of the generated instances j, the driving settings engine 220 can identify a cost function $Cost_j$ for each of the instances. In some implementations, the instance j can refer to a randomized instance for the whole route, which can consist of multiple randomly selected local sections. The cost function can refer to fuel use, fuel costs (which can take into account differences in fuel prices at different locations along the route), travel time, distance of travel, or any other relevant metric. In some implementations, the cost function can be a combination thereof, e.g., $$Cost_j = a \times \text{Fuel Used}_j + b \times \text{Time}_j + c\Delta(\text{Distance}_j),$$

a linear combination of the fuel used (or a cost of the fuel used) Fuel Used$_j$, time of travel Time$_j$, distance increment $\Delta(\text{Distance}_j)$ (from a minimum distance of travel between start and destination), and so on. Coefficients a, b, and c can represent relative weights attributed to different metrics. In some implementations, some of the coefficients can be set to zero. For example, if the fuel use/cost is the main metric, coefficients b, and c can be set to zero. If the time of travel is much more important than the fuel costs, coefficient a can be set to a small value. In some implementations, the cost function can be measured in units of currency (e.g., dollars, euros, or any other currency) or in any other units that normalize various resource costs to a single measure. The cost function can also account (e.g., via additional terms in the right hand side of the above formula for Cost) for various other consumable components and materials, such as cost of brake pads, tires, any movable/non-movable parts, motor oil, lubricants, transmission fluid, brake system fluid, steering system fluid, and so on. Costs for various components and materials can be determined using the computed driving settings. For example, the amount of steering and braking performed can be used to determine costs of wear of the corresponding components and materials of the steering system, braking system, tires, and so on.

The cost function—for the entire route or for any part of it—can be averaged over the entire ensemble, $E[Cost] = N^{-1} \Sigma_j Cost_j$, where N is the number of the randomized instances in the simulation. Because various instances are chosen based on the actual (historical) distributions of the respective route conditions, the simple averaging can be sufficient to obtain a cost function representative of the actual conditions that can be experienced by the vehicle during the mission. In other implementations, various instances can be chosen in a non-randomized way (e.g., in a way that uniformly probes various possible route conditions), but the averaging of the cost function is a weighted averaging, $E[\text{Cost}]=\Sigma_j w_j \text{Cost}_j$, with the weights $w_j$ determined from the respective distributions to account for the likelihood of occurrence of various specific route conditions. The driving settings engine 220 can determine the statistics of the cost functions for various randomized instances of the simulations, such as the probability $P(\text{Cost})\Delta\text{Cost}$ that the actual driving mission—as ascertained from the simulated route conditions—will incur the cost within the interval [Cost, Cost+$\Delta$Cost].

Figure 3:
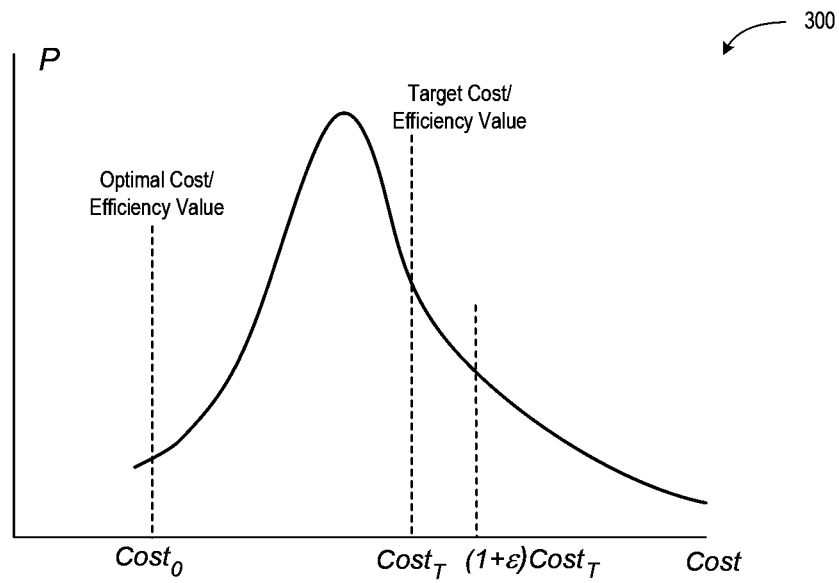
FIG. 3 illustrates how a target efficiency value can be determined based on statistical data obtained from randomized simulations, in accordance with some implementations of the present disclosure.
Figure 3:
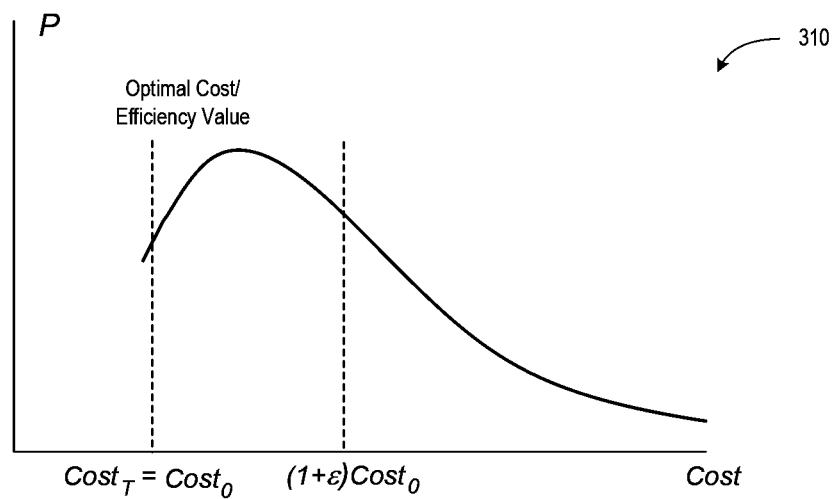

FIG. 3 illustrates how a target efficiency value can be determined based on statistical data obtained from randomized simulations, in accordance with some implementations of the present disclosure. Depicted schematically in the top plot 300 is a distribution P (Cost) of cost functions for a particular route identified by the route selection module 210 and for multiple instances of simulated route conditions 240 generated by the route conditions simulation engine 230. The distribution P(Cost) may start at a value $\text{Cost}_0$ representing a cost function for the optimal trajectory for the route. The distribution P(Cost) characterizes, in a statistical way, how various unfavorable conditions can increase the cost function of the driving mission to various values. (Some conditions, such as favorable tailwind, can decrease the cost function below the optimal cost $\text{Cost}_0$, which is indicated schematically with the extension of the distribution P(Cost) beyond the point $\text{Cost}_0$.) Based on the form of the distribution, the driving settings engine 220 or the route progression module 270 can identify a target value $\text{Cost}_T$ that can provide a better representation (than the optimal cost $\text{Cost}_0$) of a likely cost of the mission, if the route is selected. Since the distribution can be a continuous (or a quasi-continuous) function, identification of the value $\text{Cost}_T$ can be performed using one or more predetermined distribution benchmark points. For example, the target value $\text{Cost}_T$ can be the mode value, the average value, the median value of the distribution P(Cost). In some implementations, the value $\text{Cost}_T$ can be the value corresponding to the Z-th percentile of the distribution:

$$Z=\int_{\text{Cost}_0}^{\text{Cost}_T} P(\text{Cost})d(\text{Cost})$$

(where, in practice, the integral can be computed as a discrete sum). For example, the value $\text{Cost}_T$ can correspond to the 70-th percentile of all simulated trajectories, to ensure a conservative estimation of the target cost, although any other smaller (or larger) percentiles can be chosen, if more risk (or less risk) is tolerated in the prediction process. In some implementations, instead of the cost function Cost, an efficiency value can be used, which can be an inverse of the cost function: Eff=1/Cost, so that the target efficiency value of the route can be $\text{Eff}_T=1/\text{Cost}_T$. The realistic trajectory 280 as well as the corresponding realistic efficiency value 290 (or cost function) can be output by the driving settings engine 220 or the route progression module 270 and provided to the route selection module 210. In some implementations, as shown in the bottom plot in FIG. 3, the optimal cost (and/or efficiency value) can be taken as the target cost (efficiency value).

The Monte Carlo simulations, as described, can be performed for each route (including different departure times) identified by the route selection module 210 with the realistic trajectory 280 determined based on the corresponding optimal trajectory and the simulated route conditions 240. Likewise, for each realistic trajectory, the target efficiency value 290 can be output as well. In some implementations, simulated route conditions 240 can be generated for each route independently. In other implementations, at least some of the simulated route conditions 240 can be used for multiple routes, reducing the amount of computations to be performed. Indeed, because some routes considered are likely to pass through the same geographical area, the same (or similar) conditions can be shared among more than one route. For example, the route from Chicago to Los Angeles that uses interstate road 1-80 through Wyoming is likely to have similar weather conditions as the route that uses interstate road 1-70 through Colorado (but can be less likely to have weather conditions similar to interstate road 1-40 through New Mexico). In some implementations, simulated weather conditions for different routes can still have some (albeit smaller) variations from each other, to account for local weather changes, e.g., the amount of precipitation and wind can differ somewhat even for routes that are located in proximity to each other (such as 1-70 and 1-80). Other simulated route conditions, such as traffic conditions, can be largely (or completely) uncorrelated even for closely situated roads.

In some implementations, simulated route conditions 240 can belong to a number of preconfigured buckets. A "bucket" can refer to a set of conditions, in which each condition belongs to an interval of values. For example, traffic speed 254 can be discretized into the following intervals: at or above speed limit, 10 mph below speed limit, 20 mph below speed limit, and so on (k categories in total). Wind 261 can be categorized as headwind, tailwind, crosswind, etc. (1 categories in total), and further categorized by speed, e.g., 0-15 mph, 15-30 mph, 30-40 mph, etc. (m categories in total), and so on. Accordingly multiple buckets (total number k×l×m×n× . . . ) can be defined, in which various categories of route conditions are combined with various other possible categories. The historical data 182 can then specify likelihoods (probabilities) that each of the buckets of conditions can be realized. Accordingly, various trajectories are to be determined in view of the buckets selected (for the entire route or any section of it) with the likelihoods specified by the historical data 182. Subsequently, the simulations can be performed as described above.

In addition to the optimal trajectory 280 and the target efficiency value 290, the driving settings engine 220 and/or the route progression module 270 can output (for each route) a confidence level 295 characterizing a likelihood that the target efficiency value 290 can be achieved during the actual driving mission. The question of a realized efficiency can be a statistical (rather than deterministic) question. In actuality, a trajectory can be realized that is better than some or many of the simulated realistic trajectories, if the actual route conditions are more favorable than the simulated route conditions 240. Similarly, the actual route conditions can be less favorable than some of the simulated route conditions 240. The target efficiency value (which can be different from the optimal efficiency value) can account for some of the expected amount of unfavorable conditions. Additionally, a tolerance E can be defined that characterizes a degree to which unfavorable deviations from the target efficiency value can be tolerated. For example, with reference to upper plot 310 on FIG. 3, confidence level can be defined as the probability that the actual trajectory has a cost that does not exceed the computed target cost $\text{Cost}_T$ by more than the relative error E. Accordingly, the confidence level in terms of the distribution P(Cost) can be defined as:

$$CL=\int_{\text{Cost}_0}^{(1+\epsilon)\text{Cost}_T} P(\text{Cost})d(\text{Cost}),$$

which characterized the likelihood that actual driving mission will have the cost function that does not exceed $(1+\varepsilon)\text{Cost}_T$. Distributions P(Cost) that are spread over a broad range of Cost tend to have lower confidence levels whereas those distributions that have narrow width tend to have higher confidence levels. In those implementations, that do not distinguish between the target efficiency value and the optimal efficiency value—see FIG. 3 (upper plot)—the confidence level can be similarly defined as the probability that the actual trajectory has a cost that does not exceed the computed optimal cost $\text{Cost}_0$ by more than the relative error E. Accordingly, the confidence level in terms of the distribution P(Cost) can be defined as:

$$CL = \int_{Cost_0}^{(1+\varepsilon)Cost_0} P(\text{Cost}) d(\text{Cost}),$$

which characterizes the likelihood that actual driving mission will have the cost function that does not exceed $(1+\varepsilon)\text{Cost}_0$.

It should be understood that the above examples are provided for illustration purposes and do not exhaust various ways in which confidence level can be defined. Another possibility can be to define confidence level as a ratio of the standard deviation to the expectation value, such as $CL = \sqrt{\text{Var}[\text{Cost}]}/E[\text{Cost}]$. Yet another measure of the spread of the distribution P(Cost)—and, therefore, of the confidence level—can be $CL = \text{Cost}_T/\text{Cost}_0$. A person of ordinary skill in this technology should understand that there is a virtually unlimited number of ways in which confidence level can be defined based on the form of the distribution P(Cost) of cost values identified during route conditions simulations.

In some implementations, realistic trajectories are computed starting from the respective optimal trajectory. Specifically, after the optimal trajectory is identified, various realistic trajectories can be determined, based on local conditions, by discounting optimal trajectory values from the respective values for the optimal trajectory. For example, based on the simulated strength of the crosswind, the driving settings engine 220 can determine how much the speed is to be decreased from the optimal speed and adjust throttle settings for the realistic trajectory accordingly. In some implementations, however, the optimal trajectory may not be used for simulations of the realistic trajectories. Instead, driving settings for each trajectory can be determined independently, without relying on the optimal trajectory.

The optimal trajectory 280, target efficiency value 290, and the confidence level 295 for each route can be provided to the route selection module 210. The route selection module 210 can perform selection of one or more of the identified routes, based on the target efficiency value 290 and (optionally) on the corresponding confidence level 295. In those instances, where multiple routes have the same confidence level, the route with the highest efficiency value (lowest cost function) can be selected to be implemented as part of the driving mission. In other instances, where routes have different confidence levels, a route with a lower efficiency value but a higher confidence level can be selected. Selection can be performed using a selection function that weighs efficiency value against confidence level. In one implementation, selection function can be a function of the form, $SF = A \times Eff + B \times CL$, or $SF = A \times (Eff)^2 + B \times (CL)^2$, with appropriately (e.g., empirically) chosen coefficients A and B, or any other function SF(Eff,CL) that compares gains (or losses) in the confidence level to gains (or losses) in the efficiency value.

In some implementations, the route selection module 210 can identify top N routes characterized by the highest values of the selection function SF, which can be ranked in the order of decreasing SF. Having identified the top routes, the route selection module 210 can provide the description of each route, together with the respective driving settings (target trajectories), to AV 101. AV 101, e.g., via CRP 110 can implement one of the respective top routes (e.g., the route with the highest selection function) and set up the driving mission according to the driving settings of the respective optimal trajectory, which can include throttle/gear/brake/lane control, and the like.

In some implementations, when the driving mission is underway, CRP 110 can both provide the (optimal) driving settings to AVCS 140 at correct locations along the route and monitor progression of AV 101 along the selected route. When unfavorable weather or traffic conditions are encountered, AVCS 140 can override the driving settings of the optimal trajectory, based on information obtained from the sensing system 120 and processed by the perception system 130. When the conditions improve, CRP 110 can return AV 101 to the optimal trajectory. In some instances, weather (or traffic) conditions can be detrimental to such a significant and prolonged extent that returning to the optimal trajectory for the current route can be impossible. In such instances, CRP 110 can determine whether other routes among the top routes communicated by RPS 150 can provide a superior performance given the current conditions. If such a superior route is identified by CRP 110, CRP 110 can direct AV 101 to the new route. Alternatively, or when no better routes are identified by CRP 110, CRP 110 can communicate to RPE 160 a request to perform additional simulations based on the current location of AV, time of day, and the remaining travel to destination. Some of the conditions that are currently known (e.g., weather conditions) can be used in the simulations, whereas some of the remaining conditions can still be unknown. The unknown conditions can be simulated by the route conditions simulations engine as described above. The unknown conditions can include local traffic, weather conditions that can occur on other days of the driving mission (in cases where the driving mission includes multi-day travel), and so on. Having determined the new set of the routes for AV, RPS 150 can communicate the new routes/trajectories to CRP 110 for actual implementation.

Figure 4:
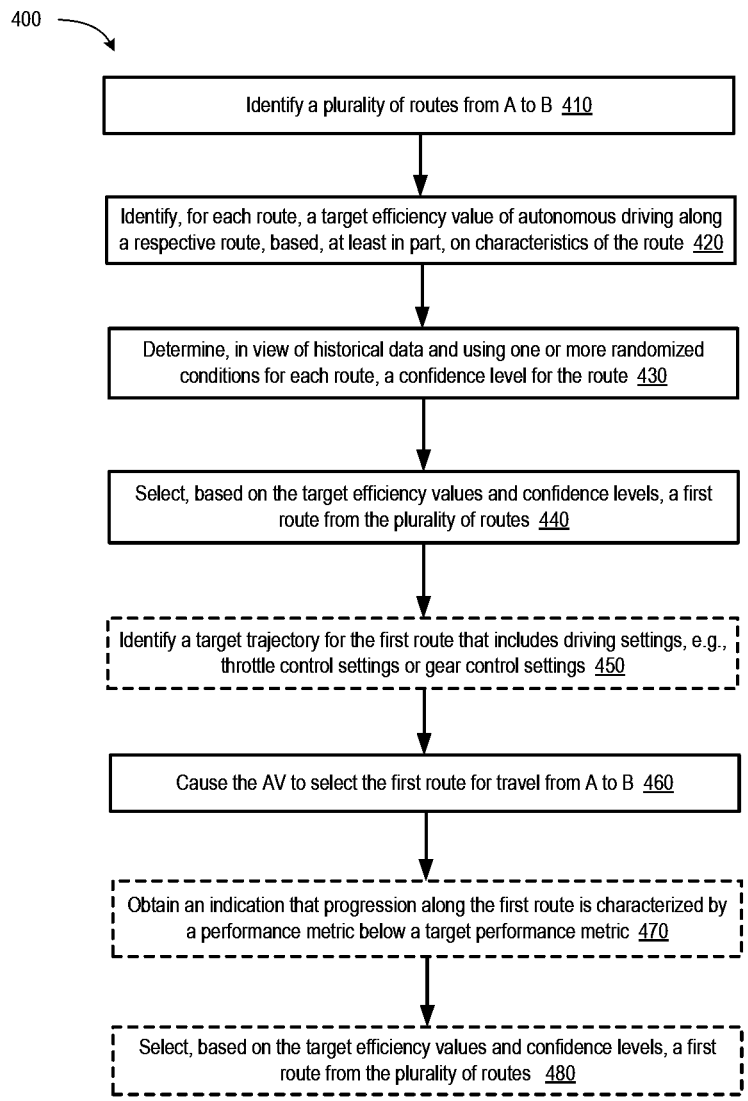
FIG. 4 depicts a flow diagram of an example method of identifying preferred routes for autonomous driving vehicles, in accordance with some implementations of the present disclosure.

FIG. 4 depicts a flow diagram of an example method 400 of identifying preferred routes for autonomous driving vehicles, in accordance with some implementations of the present disclosure. Method 400, as well as methods 500 and 600 described below, and/or each of their individual functions, routines, subroutines, or operations can be performed by a processing device, having one or more processing units (CPU) and memory devices communicatively coupled to the CPU(s). The processing device executing methods 400, 500, and 600 can perform instructions from various components of a route processing server (located outside an autonomous vehicle) or a client route processing module (located within or at the autonomous vehicle), or any combination thereof. In certain implementations, methods 400, 500, and 600 can be performed by a single processing thread. Alternatively, methods 400, 500, and 600 can be performed by two or more processing threads, each thread executing one or more individual functions, routines, subroutines, or operations of the method. In an illustrative example, the processing threads implementing each of methods 400, 500, and 600 can be synchronized (e.g., using semaphores, critical sections, and/or other thread synchronization mechanisms). Alternatively, the processing threads implementing each of methods 400, 500, and 600 can be executed asynchronously with respect to each other. Various operations of each of methods 400, 500, and 600 can be performed in a different order compared with the order shown in FIGS. 4, 5, and 6.

Some operations of the methods can be performed concurrently with other operations. Some operations can be optional.

Method 400 can be directed to systems and components related to autonomous driving vehicles, such as the AV 101 of FIG. 1. Method 400 can be used to improve route planning and route processing for efficient performance of autonomous driving missions. At block 410, method 400 can include identifying a plurality of routes from a first location (A) to a second location (B). The first location and the second location can be a part of an external information, e.g., originating from a business (shipping, warehousing, supply, etc.) unit of a trucking (or any other transportation) company. The identified routes can be routes that are accessible to the type of the vehicle that is going to be used in the expected driving mission. The identified routes can have a total driving distance that is no longer than a certain predetermined value (e.g., 1.2, 1.3, or any other value) relative to the minimum driving distance between the first location and the second location or are expected to require the total driving time that is no more than a certain predetermined amount (e.g., 1.3, 1.4, or any other amount) of the minimum driving time. Routes that have the total driving distance (or expected driving time) in excess of the predetermined limits can be excluded from further processing.

At block 420, method 400 can continue with the processing device identifying, for each of the plurality of identified routes, a target efficiency value (e.g., a number, a percentage, etc.) of autonomous driving along a respective route. In some implementations, the target efficiency value can be based, at least in part, on characteristics (e.g., physical characteristics) of the respective route. For example, the characteristics of the respective route can include grade values (e.g., angles that the road surface makes with a horizontal direction) for various locations along the route. In some implementations, the grade values can be defined in a continuous way. In some implementations, the grade values can be defined in a quasi-continuous way, e.g., as a set of values for various discrete portions of the route. Additionally, the characteristics of the respective route can similarly include curvature values (e.g., radii of road curvature or lane curvature) for various locations along the route. The characteristics of the respective route can similarly include a plurality of values indicating road surface quality at various locations along the respective route, e.g., "paved smooth," "paved uneven," "smooth unpaved," "unpaved washboard," "loose gravel," and the like. Additionally, the characteristics of the respective route can include lane information for the respective route, e.g., a number of lanes in the direction of travel (from A to B) at various locations along the route. In some implementations, the characteristics of the respective route can include speed limit information (such as maximum and/or minimum speed) and other traffic regulations at various locations along the route. In some implementations, the characteristics of the respective route can include an expected time of departure for the respective route. The expected time of departure can be the same for some or all of the identified paths. In some implementations, the expected time of departure can be different for at least some of the identified paths.

In some implementations, the target efficiency value (or cost function) can be based, at least in part, on a total fuel consumption for the respective route. In some implementations, the target efficiency value (or cost function) can be based on a plurality of metrics, including but not limited to fuel consumption, total travel time, total distance travelled, cost of consumable components (which can include various wearable parts and materials), and so on. The target efficiency value (or cost function) can be determined using various low-scale routines, functions, or algorithms that identify the optimal driving settings (e.g., driving settings that maximize efficiency value or minimize the cost function) for a short-scale horizon, e.g., a portion of the route having a length of several hundred meters (or shorter) to several miles (or longer). The low-scale routines, functions, or algorithms can account for the technical characteristics of the AV—empty weight, engine power, torque, maximum speed, maximum acceleration, load type, load weight, mileage (with and without load), and so on. The driving settings identified by the low-scale routines, functions, or algorithms can include throttle control settings (e.g., the degree to which the throttle is to be opened at various locations along the route), gear control settings, brake control settings, and the like. The target efficiency value can be based on some or all portions of the road. For example, the total efficiency value can be an inverse of the cost function, which can be an additive quantity obtained by adding up cost functions for individual portions of the route.

At block 430, method 400 can continue with determining, in view of historical data for the respective route, a confidence level associated with the target efficiency value. More specifically, the confidence level can include a statistical measure of how likely the efficiency value of the actual driving mission (e.g., the actual fuel consumption) is to depart significantly from the target efficiency value. In some implementations, determining the confidence level can include using one or more randomized conditions for the respective route. For example, randomized weather and/or traffic data can be generated based on the historical data, which can include past weather data for the respective route and/or traffic data for the respective route. Generating randomized conditions can include performing Monte Carlo simulations to produce multiple instances (constituting an ensemble) of the same route under different conditions that are represented in the ensemble with the probability that reflects a historical rate of occurrence of such conditions in the past. Each instance of the route in the ensemble can be characterized with a computed efficiency value/cost function that is different from efficiency values of other simulated instances. Accordingly, at block 430, method 400 can generate, for each of the identified routes, a distribution of efficiency values/cost functions over the generated ensemble. In some implementations, the confidence level can be determined based on the form of the obtained distribution, as has been disclosed in more detail above and is also described in reference to method 500 below.

At block 440, the processing device can select, based on the target efficiency value and the associated confidence level for each of the plurality of routes, a first route of the plurality of routes as a preferred route. Higher efficiency values (lower cost functions) and higher confidence levels can be favored over lower efficiency values and higher confidence levels, but a selection function can be defined to determine whether a particular efficiency value gain should be preferred to a gain in the confidence level, as has been disclosed in more detail above and is further described in reference to method 600 below.

At optional block 450, method 400 can continue with the processing device identifying an optimal trajectory for the first route. The optimal trajectory can include driving settings for the AV, e.g., as described above in relation to block 420. Specifically the driving settings can be based on the technical characteristics of the AV and can include throttle control settings, gear control settings, lane control settings, brake control settings, and the like, for the entire first route or at least a portion of the first route. The optimal trajectory can be provided to the AV to be implemented during the actual driving mission.

At block 460, method 400 can continue with causing the AV to select the first route for travel from the first location to the second location. For example, the client route processing 110 can receive the first trajectory driving settings data and provide the received data (e.g., at specific locations, as the AV progresses along the first route) to the autonomous vehicle control system 140, which can then chart the driving path of the AV in accordance with the driving settings of the first trajectory (subject to local control from the sensing system 120 and perception system 130).

At optional block 470, method 400 can continue with the processing device obtaining an indication that progression of the AV along the first route is characterized by a performance metric that does not match a target performance metric. For example, CRP 110 can determine that AV's performance along the first route is substantially below the optimal trajectory performance. The performance metric can include fuel efficiency, driving time, average speed along the first route and so on. The target performance metric can be based on the optimal trajectory performance. For example, the target performance metric can be 90% of the fuel efficiency, 80% of the target speed, 115% of the total driving time of the optimal trajectory, and so on, or any combination thereof.

At optional block 480, method 400 can continue with the processing device, responsive to determining that the performance metric for the first route does not match the target performance metric, identifying and selecting a second route from the plurality of routes as the next preferred route. In some implementations, CRP 110 can communicate to the route processing server 150 a request to identify an alternative route. Having received such request, the route processing server 150 can access the plurality of stored target efficiency values and confidence levels for other routes of the plurality of routes and identify the second route as having the next highest selection function. In some implementations, the route processing server can re-run the simulations before identifying the second route as the next preferred rout. In some implementations, during the re-run of the simulations, the route processing server can use the known conditions (e.g., current weather along various routes) as well as unknown conditions and as well as lesser-known conditions (e.g., future traffic speed/density, wind, etc.).

Figure 5:
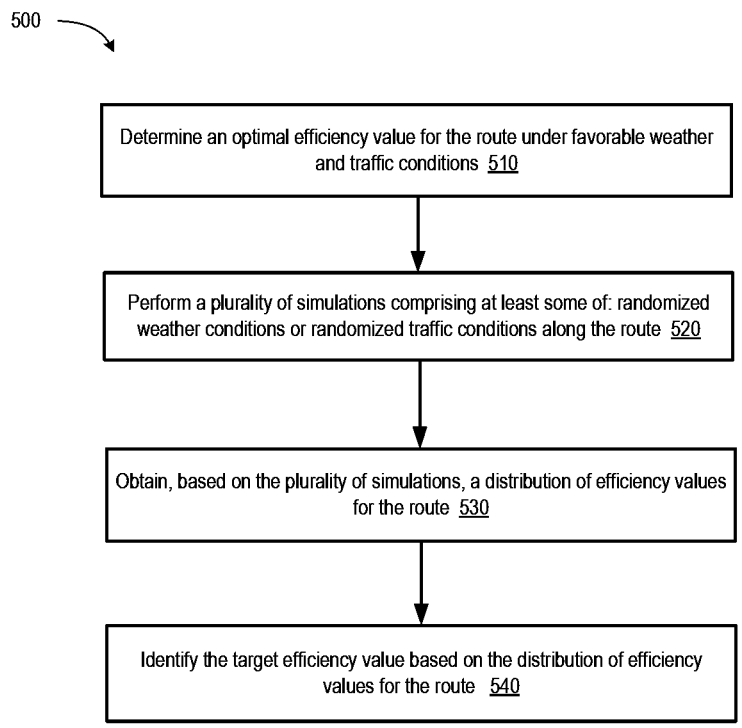
FIG. 5 depicts a flow diagram of an example method of determining a target efficiency value for a given route, in accordance with some implementations of the present disclosure.

FIG. 5 depicts a flow diagram of an example method 500 of determining a target efficiency value for a given route, in accordance with some implementations of the present disclosure. Method 500 can be performed in conjunction with block 420 of method 400 of identifying preferred routes for autonomous driving vehicles and can be performed for multiple (or all) routes identified at block 410. At block 510, the processing device performing method 500 can determine an optimal efficiency value for the respective route under favorable weather and traffic conditions. In some implementations, favorable weather conditions can mean a dry surface, absence of precipitations, good visibility, no headwind or crosswind. Similarly, favorable weather conditions can mean absence of traffic. In some implementations, an optimal efficiency value can be determined for a situation where no other traffic is present. The optimal efficiency value (or optimal cost function) can be determined using the same (or similar) low-scale routines, functions, or algorithms as described above in reference to block 420 of method 400. The identified optimal driving settings can include throttle control settings, gear control settings, brake control settings, and the like. The optimal efficiency value can be based on some or all portions of the road and can be an inverse of the cost function added up for individual portions of the route.

At block 520, method 500 may continue with the processing device performing a plurality of simulations comprising at least some of: randomized weather conditions or randomized traffic conditions along the respective route. The simulations performed to determine the target efficiency value can be the same or similar to simulations used in block 430 of method 400 for determining the confidence level. The target efficiency value can be a statistical measure of how likely the efficiency value of the actual driving mission is to differ from the optimal efficiency value. For example, a route largely passing through rural regions is more likely to have the target efficiency value that is closer to the optimal efficiency value than a route that spurs into a number of major metropolitan areas. In some implementations, determining the target efficiency value can include using one or more randomized conditions for the respective route. The randomized weather and/or traffic data can be generated based on the historical data, which can include past weather data for the respective route and/or traffic data for the respective route. Generating randomized conditions can include performing Monte Carlo simulations to produce multiple instances (constituting an ensemble) of the same route under different conditions that are represented in the ensemble with the probability reflecting the historical rate of occurrence of such conditions in the past. Each instance of the route in the ensemble can be characterized with a computed efficiency value/cost function that is different from efficiency values of other simulated instances. Accordingly, at block 530, method 500 can obtain, for each of the identified routes and based on the plurality of simulations, a distribution of efficiency values (or cost functions) for the respective route.

Method 500 can continue, at block 540 with the processing device identifying the target efficiency value based on the distribution of efficiency values for the respective route. In some implementations, the target efficiency value can be determined based on the form of the obtained distribution, e.g., by applying a predetermined criterion to the distribution of efficiency values (or cost functions) for the respective route. For example, applying the predetermined criterion can include determining a set percentile of the distribution (e.g., 50-th, 60-th, etc. percentile) of the target efficiency values (or cost functions). In some implementations, applying the predetermined criterion can include determining a mean value of the distribution, a standard deviation of the distribution, and so on.

Figure 6:
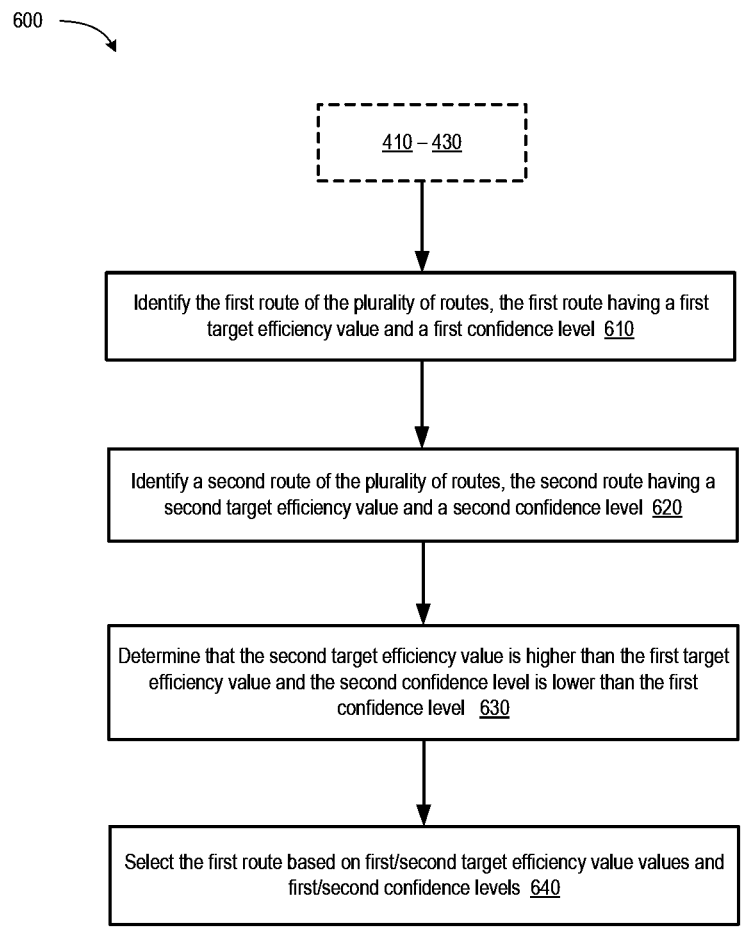
FIG. 6 depicts a flow diagram of an example method of selecting preferred routes based on target efficiency values and confidence levels for a plurality of identified routes, in accordance with some implementations of the present disclosure.

FIG. 6 depicts a flow diagram of an example method 600 of selecting preferred routes based on target efficiency values and confidence levels for a plurality of identified routes, in accordance with some implementations of the present disclosure. Method 600 can be performed in conjunction with blocks 410-430 of method 400 (which identifies preferred routes) or in conjunction with method 500 (which identifies target efficiency values and confidence levels). At block 610, method 600 may involve identifying a first route having a first target efficiency value and a first confidence level. Similarly, at block 620, method 600 may include identifying a second route having a second target efficiency value and a second confidence level. (An arbitrary number of additional routes can be identified, e.g., a third route, a fourth route, etc.) At block 630, the processing device performing method 600 can determine that the second target efficiency value is higher than the first target efficiency value and the second confidence level is lower than the first confidence level and continue, at block 640, with selecting, based on the results of such determination, the first route as the preferred route. When determining which of the two routes to select as the preferred route, the processing device performing method 600 can use various selection functions that quantitatively compare whether a loss in the target efficiency value is sufficiently compensated by a gain in the confidence level. Selection functions can be linear or non-linear functions, or a set of heuristics, obtained empirically or via modeling that uses some model distributions, such as Gauss's distribution, Poisson's distribution or any other appropriate model distributions. In the course of such modeling, expectation values of various model distributions can be compared to determine whether a shift of some marker of the distribution (e.g., an increase in the target efficiency value corresponding to a certain percentile of the distribution) should be favored (or not) over the broadening of the distribution (e.g., a decrease of the confidence level).

Figure 7:
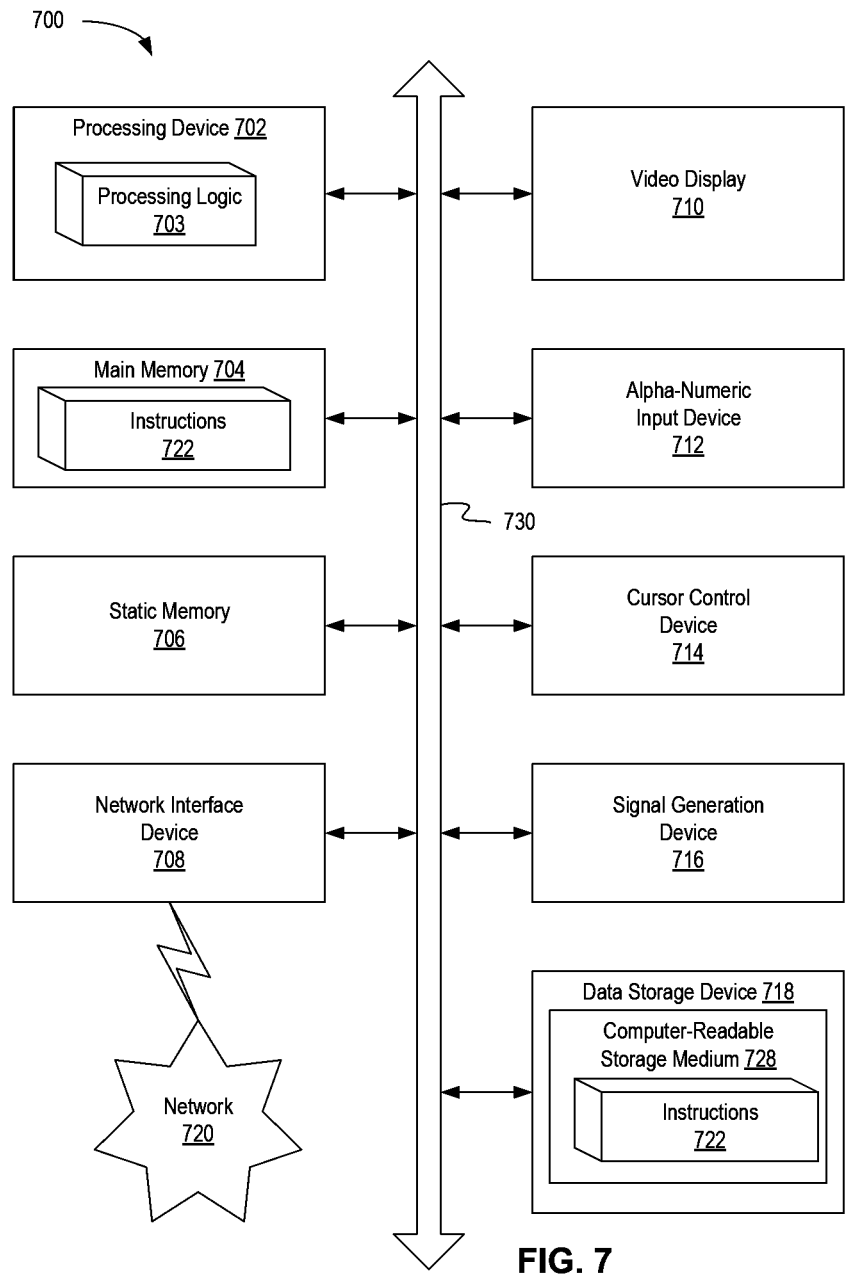
FIG. 7 depicts a block diagram of an example computer device capable of enabling route optimization for an autonomous vehicle, in accordance with some implementations of the present disclosure.

FIG. 7 depicts a block diagram of an example computer device 700 capable of enabling route optimization for an autonomous vehicle, in accordance with some implementations of the present disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), which can include processing logic 703, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions performing method 400 of identifying preferred routes for autonomous driving vehicles, in accordance with some implementations of the present disclosure, method 500 of determining a target efficiency value for a given route, in accordance with some implementations of the present disclosure, and method 600 of selecting preferred routes based on target efficiency values and confidence levels.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions performing method 400 of identifying preferred routes for autonomous driving vehicles, in accordance with some implementations of the present disclosure, method 500 of determining a target efficiency value for a given route, in accordance with some implementations of the present disclosure, and method 600 of selecting preferred routes based on target efficiency values and confidence levels.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method for routing an autonomous vehicle (AV), the method comprising:
    identifying a plurality of routes from a first location to a second location;
    identifying, by a processing device, for each of the plurality of routes, a target efficiency value of autonomous driving along a respective route, wherein the target efficiency value is based, at least in part, on characteristics of the respective route and is determined based on a plurality of simulations comprising one or more randomized synthetic conditions for the respective route, wherein the one or more randomized synthetic conditions are randomly sampled from a distribution associated with historical data for the respective route and comprise at least one of:
        randomized synthetic weather conditions along the respective route, or
        randomized synthetic traffic conditions along the respective route;
    determining, in view of historical data for the respective route, a confidence level associated with the target efficiency value, wherein determining the confidence level comprises using the one or more randomized synthetic conditions for the respective route;
    selecting, based on the target efficiency value and the associated confidence level for each of the plurality of routes, a first route of the plurality of routes; and
    causing the AV to select the first route for travel from the first location to the second location.

2. The method of claim 1, wherein the characteristics of the respective route comprise one or more of: a plurality of grade values for the respective route, a plurality of curvature values for the respective route, speed limit information, or lane information for the respective route.

3. The method of claim 1, wherein the characteristics of the respective route comprise an expected time of departure for the respective route.

4. The method of claim 1, wherein the historical data comprises one or more of: weather data for the respective route or traffic data for the respective route.

5. The method of claim 1, wherein the target efficiency value is based, at least in part, on one or more of: a fuel consumption or a cost of consumable components for the respective route.

6. The method of claim 1, wherein identifying the target efficiency value comprises:
    determining an optimal efficiency value for the respective route under favorable weather and traffic conditions;
    obtaining, based on the plurality of simulations, a distribution of efficiency values for the respective route; and
    identifying the target efficiency value based on the optimal efficiency value and the distribution of efficiency values for the respective route.

7. The method of claim 6, wherein identifying the target efficiency value based on the distribution of efficiency values comprises:
    applying a predetermined criterion to the distribution of efficiency values for the respective route.

8. The method of claim 1, further comprising:
    identifying an optimal trajectory for the first route, wherein the optimal trajectory comprises driving settings for the AV, wherein the driving settings are based on technical characteristics of the AV and comprise at least some of: throttle control settings or gear control settings for the AV for at least a portion of the first route.

9. The method of claim 1, wherein selecting the first route comprises:
    identifying the first route of the plurality of routes, the first route having a first target efficiency value and a first confidence level;
    identifying a second route of the plurality of routes, the second route having a second target efficiency value and a second confidence level;
    determining that the second target efficiency value is higher than the first target efficiency value and the second confidence level is lower than the first confidence level; and
    selecting, based on the determining, the first route.

10. The method of claim 1, further comprising:
obtaining an indication that the AV's progression along the first route is characterized by a performance metric that does not match a target performance metric; and
selecting, based on the target efficiency value and the confidence level for the target efficiency value along each of the plurality of routes, a second route from the plurality of routes.

11. A system for routing an autonomous vehicle (AV), the system comprising:
a memory device; and
a processing device, communicatively coupled to the memory device, wherein the processing device is to:
identify a plurality of routes from a first location to a second location;
identify, for each of the plurality of routes, a target efficiency value of autonomous driving along a respective route, wherein the target efficiency value is based, at least in part, on characteristics of the respective route and is determined based on a plurality of simulations comprising one or more randomized synthetic conditions for the respective route, wherein the one or more randomized synthetic conditions are randomly sampled from a distribution associated with historical data for the respective route and comprise at least one of:
randomized synthetic weather conditions along the respective route, or
randomized synthetic traffic conditions along the respective route;
determine, in view of historical data for the respective route, a confidence level associated with the target efficiency value, wherein determining the confidence level comprises using one or more randomized synthetic conditions for the respective route;
select, based on the target efficiency value and the associated confidence level for each of the plurality of routes, a first route of the plurality of routes; and
cause the AV to select the first route for travel from the first location to the second location.

12. The system of claim 11, wherein the characteristics of the respective route comprise one or more of: a plurality of grade values for the respective route, a plurality of curvature values for the respective route, speed limit information, or lane information for the respective route.

13. The system of claim 11, wherein the historical data comprises one or more of: weather data for the respective route or traffic data for the respective route.

14. The system of claim 11, wherein the target efficiency value is based, at least in part, on a fuel consumption or a cost of consumable components for the respective route.

15. The system of claim 11, wherein to identify the target efficiency value the processing device is to:
determine an optimal efficiency value for the respective route under favorable weather and traffic conditions;
obtain, based on the plurality of simulations, a distribution of efficiency values for the respective route; and
identify the target efficiency value based on the optimal efficiency value and the distribution of efficiency values for the respective route.

16. The system of claim 15, wherein to identify the target efficiency value based on the distribution of efficiency values the processing device is to:
apply a predetermined criterion to the distribution of efficiency values for the respective route.

17. The system of claim 11, wherein the processing device is further to:
identify an optimal trajectory for the first route, wherein the optimal trajectory comprises driving settings for the AV, wherein the driving settings are based on technical characteristics of the AV and comprise at least some of: throttle control settings or gear control settings for the AV for at least a portion of the first route.

18. The system of claim 11, wherein to select the first route the processing device is to:
identify the first route of the plurality of routes, the first route having a first target efficiency value and a first confidence level;
identify a second route of the plurality of routes, the second route having a second target efficiency value and a second confidence level;
determine that the second target efficiency value is higher than the first target efficiency value and the second confidence level is lower than the first confidence level; and
select, based on the determining, the first route.

19. The system of claim 11, wherein the processing device is further to:
obtain an indication that the AV's progression along the first route is characterized by a performance metric that does not match a target performance metric; and
select, based on the target efficiency value and the confidence level for the target efficiency value along each of the plurality of routes, a second route from the plurality of routes.

20. A non-transitory computer-readable medium having instructions stored thereon that, when executed by a processing device, cause the processing device to:
identify a plurality of routes for an autonomous vehicle (AV) from a first location to a second location;
identify, for each of the plurality of routes, a target efficiency value of autonomous driving along a respective route, wherein the target efficiency value is based, at least in part, on characteristics of the respective route and is determined based on a plurality of simulations comprising one or more randomized synthetic conditions for the respective route, wherein the one or more randomized conditions are randomly sampled from a distribution associated with historical data for the respective route and comprise at least one of:
randomized synthetic weather conditions along the respective route, or
randomized synthetic traffic conditions along the respective route;
determine, in view of historical data for the respective route, a confidence level associated with the target efficiency value, wherein determining the confidence level comprises using one or more randomized synthetic conditions for the respective route;
select, based on the target efficiency value and the associated confidence level for each of the plurality of routes, a first route of the plurality of routes; and
cause the AV to select the first route for travel from the first location to the second location.

* * * * *